June 7, 1955 R. D. GALLMEYER 2,710,016
FLUID-BLENDING APPARATUS
Filed May 13, 1953 2 Sheets-Sheet 1

INVENTOR.
RICHARD D. GALLMEYER
BY
Lockwood, Galt, Woodard, & Smith
ATTORNEYS

June 7, 1955 R. D. GALLMEYER 2,710,016
FLUID-BLENDING APPARATUS
Filed May 13, 1953 2 Sheets-Sheet 2
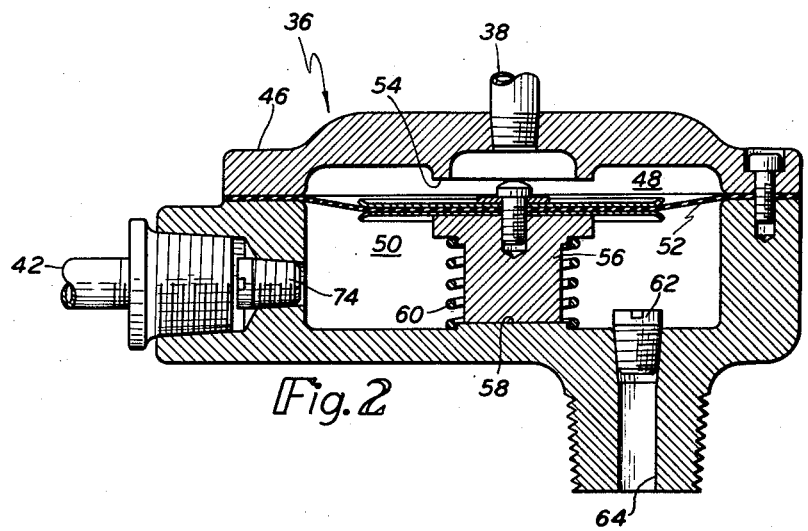
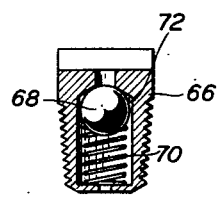
INVENTOR.
RICHARD D. GALLMEYER
BY
Lockwood, Galt, Woodard, & Smith
ATTORNEYS

United States Patent Office 2,710,016
Patented June 7, 1955

2,710,016

FLUID-BLENDING APPARATUS

Richard D. Gallmeyer, Fort Wayne, Ind., assignor to Service Engineering, Inc., a corporation of Indiana Application May 13, 1953, Serial No. 354,700

10 Claims. (Cl. 137—111)

The present invention relates to fluid-blending apparatus, and more particularly to an apparatus for blending water and a medicinal fluid together in predetermined proportions. A particular application of this invention comprehends mixing a vehicle, such as water, with a medicinal fluid for the purpose of dosing poultry or the like with prescribed quantities of medicine. Another purpose of this application is the mixing of a vehicle, such as water, with an insecticide for use in spraying fruit trees and other forms of vegetation.

Conventionally, preparations of medicine-containing water for poultry are made by pumping a predetermined quantity of water into a mixing tank, then introducing a concentrated fluid medicine or the like into the tank. The constituents are then thoroughly mixed by either a power operated mixing device or an instrument which is manually operated. Either method has been found to be unduly time consuming, and is attended by the difficulty of obtaining a thorough mixture.

In order to distribute the fluid mixture once obtained, it is necessary to provide some type of discharging and distributing system. In making the mixture available to poultry, it is necessary to distribute the preparation through an extensive piping system to remotely located watering troughs or the like either by means of a separate pump or by means of gravitation.

In some prior art devices, mixture of the medicinal ingredient with the water vehicle has been accomplished simultaneously with the filling of the storage tank. Such devices utilize a metering device which delivers a predetermined quantity of concentrated medicine into the stream of water being delivered to the storage tank. Apparatus for accomplishing this simultaneous mixing operation has been attended with the disadvantages of injecting improper amounts of medicine into the stream of water for successive filling operations and also of the metering device becoming fouled by the highly corrosive qualities of the concentrated medicine.

In view of the foregoing, it is an object of this invention to provide an automatic device for blending two different fluids in predetermined portions, which overcomes the aforementioned difficulties.

It is another object of this invention to provide a fluid-blending apparatus which reliably introduces repeatedly, without manual adjustment, a predetermined quantity of medicine into a given quantity of water vehicle.

It is still another object of this invention to provide a fluid-blending apparatus for mixing two different fluids together in predetermined proportions, these proportions being reliably maintained between successive mixing operations. Ancillary to this, it is an object to provide a metering arrangement which operates in response to a primary liquid being delivered to a storage reservoir thereby requiring no external source of operating power.

Other objects will become apparent as the description proceeds.

To the accomplishment of the above and related objects, my invention may be embodied in the form illustrated in the accompanying drawings, attention being called to the fact, however, that the drawing is illustrative only, and that specific changes may be made in the specific construction illustrated and described, so long as the scope of the appended claims is not violated.

In the drawings:

Figure 2 is a cross section of the metering device of Figure 1; and

Figure 3 is a sectional illustration of a check valve used in the metering device of Figure 2.

Figure 1:
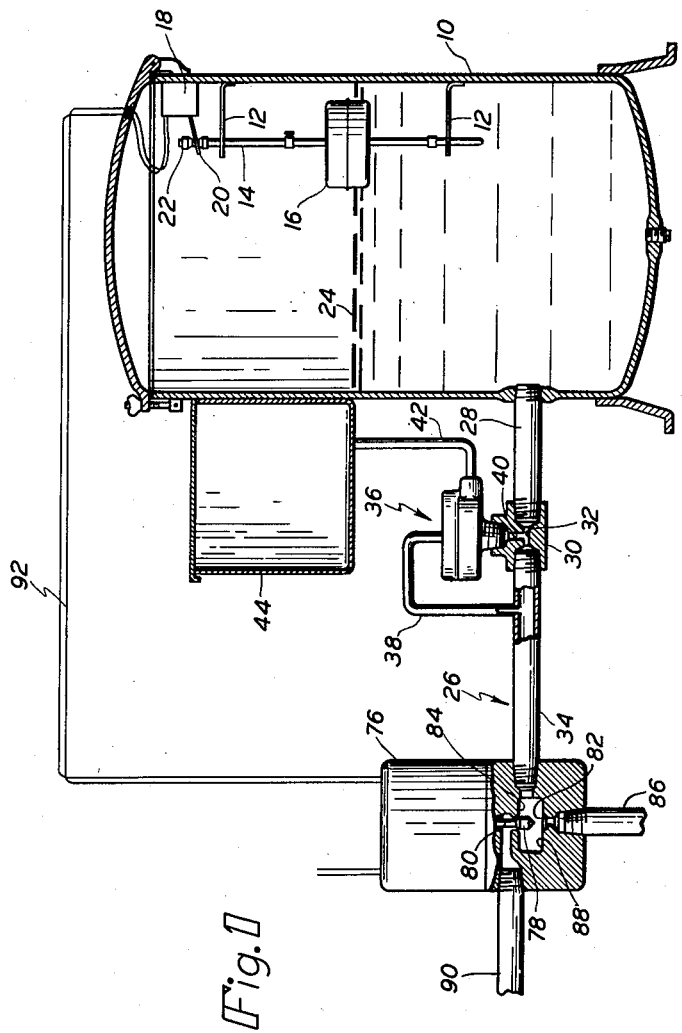
Figure 1 is a diagrammatical illustration, shown in part section, of one embodiment of this invention.

With reference to the drawings, a pressure type storage tank 10 is internally provided with two vertically spaced mounting brackets 12 which support for vertical, reciprocatory movement, a float rod 14 which carries, preferably for adjustment, intermediate its ends a conventional pneumatic or the like float 16. A conventional electrical switch 18 is mounted adjacent the upper end of the reservoir 10 with the switch handle 20 thereof projecting inwardly of the tank into operative engagement with the upper end 22 of the float bar 14. The switch 18 is so arranged that as the float 16 rises in response to an increase in level of liquid indicated by the reference numeral 24, the switch handle 20 will be operated to throw the switch. In the present instance, the switch 18 may be of the simple "on-off" type.

A combination supply and discharge line or conduit means indicated generally by the reference numeral 26, has a coupling section 28 leading to the tank 10 and a T-connection 30 which is provided with a restricted passage 32. A pipe 34 is fitted to the connection 30 thereby providing a fluid-connecting passage which extends from the interior of the tank 10 through the coupling 28, through the restricted passage 32, and thence through the pipe section 34. A metering control device, indicated generally by the reference numeral 36, is operatively connected to both the pipe section 34 and the T-connection 30 by means of a fluid pressure-conducting tube 38 and a discharge connection or passage 40. A tubular connection 42 serves to feed a fluid, such as medicine, from an elevated, auxiliary tank 44 to the control device 36, the exact arrangement of both connections 38 and 42 to the control device 36 being described in more detail in the following.

With reference to Figure 2, the control device 36 is comprised of a shell or housing 46 which is divided into two variable volume chambers 48 and 50, respectively, by a fluid pressure responsive member or diaphragm 52. An annular ridge 54 which constitutes a diaphragm stop is provided on the end wall of the chamber 48, and is engageable by the diaphragm 52 to limit the latter's movement in the upward direction. A spacing hub 56 is mounted on the underside of the diaphragm 52 so as to be disposed in the chamber 50, and the lower end of this hub is engageable with a surface or stop 58 in the end of the chamber 50 opposite the aforementioned stop 54. By this arrangement, the diaphragm is limited in its movement by means of the predetermined spacing between the stops 54 and 58. A compression spring 60 which surrounds the hub 56 bears against the lower end wall of the chamber 50 so as to urge the diaphragm 52 upwardly and against the stop 54 when the diaphragm is in its normally inoperative position. The diaphragm as shown in Figure 2 has fluid pressure applied to the upper side thereof so as to force the spacing hub 56 against the lower stop 58. Release of the pressure in chamber 48 will allow the spring 60 to force the diaphragm 52 into abutting engagement with the stop 54.

A one-way check valve 62, seen more clearly in Figure 3, is mounted in the outlet passage 64 which is adapted to be coupled to the T-connection discharge passage 40.

This valve 62 is comprised of the usual centrally apertured, externally threaded member 66 which is provided with a ball 68 and a compression spring 70, this spring forcing the ball 68 onto its seat 72. The valve is so arranged in the passage 64 that fluid may be forced from the chamber 50 into the passage 64 but cannot return therethrough.

Another one-way check valve 74 is mounted in the side wall inlet to chamber 50, and is constructed substantially identically to the valve 62. Fluid may flow from the tank 44 through the tube 42, valve 74, and into the chamber 50, but cannot return through this valve.

An electrical solenoid control valve 76, seen in Figure 1, is comprised of a conical valve 78 which is operable upon reciprocation of the solenoid plunger 80 to seat selectively on opposite valve seats 82 and 84, respectively. With the solenoid operated so as to force the valve plunger 80 downwardly, the valve 78 will engage the valve seat 82 thereby preventing fluid communication between a pipe 86 and the control valve compartment 88. Similarly, when the solenoid is so operated as to move the valve 78 into seat engagement with the valve seat 84, communication will be severed between valve compartment 88 and the pipe 90. The left end of the pipe 34 of the conduit means 26 is fitted to the control valve so as to be in continuous communication with the valve chamber 88. Suitable electrical connections 92 extend from the switch 18 to the electro-magnetic coil of the solenoid 76.

In operation, the pipe 90 is connected to a source of fluid pressure such as a water service main or a water pump. For the usual installation, the pressure of this source will range from 20 to 40 pounds per square inch. The pipe 86 may be considered as the main line to poultry-watering troughs or the like. A medicine or the like in concentrated form is placed in the auxiliary tank 44 prior to operation of the system.

In operation, assuming the level of the liquid 24 to be such as to lower the float 16 to operate switch 18, an operative electrical connection will be made to the solenoid 76 which drives the valve 78 downwardly into seating engagement with the valve seat 82. This opens the port surrounded by the valve seat 84 and allows water from the pipe 90 to flow into valve chamber 88 and into the conduit 34, from which it flows through the restricted passage 32, through the coupling 28 and into the tank 10. By reason of the restriction 32, a back-pressure will be developed which is communicated to the chamber 48 of the control device 36 by means of the pipe 38.

This pressure feeding to the chamber 48 acts to force the diaphragm 52 downwardly until the hub 56 contacts its stop 58. Since the chamber 50 is constantly fed by concentrated medicine from the tank 44, during inoperation of the control device 36, a measured quantity of such medicine will be forced from the chamber 50, through the valve 62, passage 64, and discharge outlet 40 into the restricted passage 32, the medicine thereby being injected into the stream of water flowing to the tank 10 as such stream passes through the restricted passage 32. By this arrangement, consistent, reliable mixing of the medicine and water are achieved. When the level of the liquid in the tank 10 reaches its upper limit, the float 16 will operate the switch 18 so as to open the electrical connection to the solenoid 78 thereby withdrawing the valve 78 from the seat 82 and causing it to close the inlet port surrounded by valve seat 84. The flow of liquid from the pipe 90 to the tank 10 is thereby stopped, while simultaneously, communication is established between the tank 10 and the poultry-feeding pipe 86. During the poultry-feeding time, the spring 60 of the control device 36 forces the diaphragm 52 upwardly against the stop 54 thereby allowing a quantity of medicine to flow from the tank 44 as determined by the increase in volume of the chamber 50.

By making the tank 10 fluid tight, a pressure head of air will be developed over the liquid tending to force it out of the tank and into the external system. External flow moves from the coupling 28 through the restricted passage 32, pipe 34, control valve compartment 88 and into the feeding line 86. As the liquid in the poultry-feeding troughs is consumed, the level of the liquid in the tank 10 lowers until such time as the float 16 operates the switch 18 to produce the operating cycle described in the foregoing.

It will be appreciated that thorough mixing of predetermined proportions will be reliably achieved for each operating cycle of the system. Furthermore, the arrangement is such that the highly corrosive qualities of the medicine cannot affect operation since no operating linkages or sliding surfaces which could be attacked by the medicine are used. Further advantage in the present invention resides in the self-powered arrangement for metering the medicine into the water stream thereby conducing to simplicity in design and economy of operation.

What is claimed is:

1. Apparatus for combining a plurality of different fluids in predetermined proportions comprising fluid-containing means, automatic fluid-metering control means for holding a charge of fluid and operatively associated with said fluid-containing means, conduit means operatively connected to both said control means and said fluid-containing means; said control means including a fluid-back pressure device which provides for restricted fluid flow from said conduit means to said fluid-containing means, a fluid pressure responsive mechanism having a fluid pressure-communicating connection with said device on the side thereof remote from said fluid-containing means whereby said mechanism is automatically operated when pressure fluid is introduced into said conduit means, means operatively associated with said control means for charging the latter with a predetermined quantity of fluid when no pressure fluid is introduced into said conduit means, and a fluid-communicating connection between said mechanism and said device, whereby said charge of fluid will be forced from said mechanism into said device for combining the fluid conducted by said conduit means with said charge of fluid prior to the entry of any fluid into said fluid-containing means.

2. Apparatus for mixing automatically different fluids in predetermined proportions and delivering the mixture to a reservoir comprising conduit means having a restricted passage therein, a control device having an operating connection with said conduit means whereby fluid pressure may be conducted from said conduit means to said device, a fluid discharge connection between said device and said restricted passage for delivering a quantity of measured fluid from said device to said conduit means, said device having a fluid-storing chamber and a fluid pressure responsive element which serves in discharging fluid stored in said chamber into said fluid discharge connection in response to pressure prevailing in said conduit means, said device further including pressure responsive valve means which operates during no-pressure conditions to charge said device with fluid and which operates further to direct said charge into said conduit means during pressure conditions.

3. Apparatus for mixing automatically different fluids in predetermined proportions and delivering the mixture to a reservoir comprising conduit means having a restricted passage therein, a control device having an operating connection with said conduit means whereby fluid pressure may be conducted from said conduit means to said device, a fluid discharge connection between said device and said restricted passage for delivering a quantity of measured fluid from said device to said conduit means, said device having a fluid pressure responsive member which separates two variable volume chambers, one chamber communicating with said conduit means and the other chamber communicating with said discharge connection whereby fluid pressure in said conduit means will actuate said fluid pressure responsive member to force fluid contained in said other chamber into said restricted portion of said conduit means, and two check valves operatively associated with said other chamber for alternatively controlling fluid flow into and out of said other chamber, one valve admitting fluid to said other chamber under conditions of no fluid pressure in said conduit means, and the other valve permitting fluid to flow from said other chamber into said discharge connection.

4. Apparatus for mixing automatically different fluids in predetermined proportions and delivering the mixture to a reservoir comprising conduit means having a restricted passage therein, a control device having an operating connection with said conduit means whereby fluid pressure may be conducted from said conduit means to said device, a fluid discharge connection between said device and said restricted passage for delivery of a quantity of measured fluid from said device to said conduit means, said device comprising a housing which is divided into two variable volume chambers by a fluid pressure responsive member, one chamber communicating with said conduit means and the other chamber communicating with said discharge connection, stops provided on opposite end walls of both chambers whereby said fluid pressure responsive member is limited in its movement in opposite directions, and means yieldably urging said member toward the stop in said one chamber, one-way check valve means mounted in said discharge connection to prevent fluid from flowing from said restricted passage into said other chamber but to allow fluid flow from said other chamber to said restricted passage, said member operating in response to fluid pressure in said conduit means to force fluid from said second chamber into said restricted passage of said conduit means.

5. Apparatus for mixing automatically different fluids in predetermined proportions and delivering the mixture to a reservoir comprising conduit means having a restricted passage therein, a control device having an operating connection with said conduit means whereby fluid pressure may be conducted from said conduit means to said device, a fluid discharge connection between said device and said restricted passage for delivering a quantity of measured fluid from said device to said conduit means, said device comprising a housing which is divided into two variable volume chambers by a fluid pressure responsive member, one chamber communicating with said conduit means and the other chamber communicating with said discharge connection, stops provided on opposite end walls of both chambers whereby said fluid pressure responsive member is limited in its movement in opposite directions, a spring yieldably urging said member toward the stop in said one chamber, one-way check valve means mounted in said discharge connection to prevent fluid from flowing from said restricted passage into said other chamber but to allow fluid flow from said other chamber to said restricted passage, said member operating in response to fluid pressure in said conduit means to force fluid from said second chamber into said restricted passage of said conduit means, said conduit means being provided with a coupling on the side of said restricted passage opposite the operating connection between said conduit means and said control device for attachment to a storage reservoir, and a control valve in said conduit means on the same side of said restricted passage as the last-mentioned operating connection for selectively admitting pressure fluid to said conduit means and for draining fluid from said conduit means whereby said reservoir is both filled and drained through said conduit means.

6. Apparatus for mixing automatically different fluids in predetermined proportions and delivering the mixture to a reservoir comprising conduit means having a restricted passage therein, a control device having an operating connection with said conduit means whereby fluid pressure may be conducted from said conduit means to said device, a fluid discharge connection between said device and said restricted passage for delivering a quantity of measured fluid from said device to said conduit means, said device comprising a housing which is divided into two variable volume chambers by a fluid pressure responsive diaphragm, one chamber communicating with said conduit means and the other chamber communicating with said discharge connection, stops provided on opposite end walls of both chambers whereby said fluid pressure responsive diaphragm is limited in its movement in opposite directions, a spring yieldably urging said diaphragm toward the stop in said one chamber, one-way check valve means mounted in said discharge connection to prevent fluid from flowing from said restricted passage into said other chamber but to allow fluid flow from said other chamber to said restricted passage, said diaphragm operating in response to fluid pressure in said conduit means to force fluid from said second chamber into said restricted passage of said conduit means, said conduit means being provided with a coupling on the side of said restricted passage opposite the operating connection between said conduit means and said control device for attachment to a storage reservoir, and a control valve in said conduit means on the same side of said restricted passage as the last-mentioned operating connection for selectively admitting pressure fluid to said conduit means and for draining fluid from said conduit means whereby said reservoir is both filled and drained through said conduit means.

7. Apparatus for mixing automatically different fluids in predetermined proportions and delivering the mixture to a fluid-tight reservoir comprising conduit means having a restricted passage therein, a control device having an operating connection with said conduit means whereby fluid pressure may be conducted from said conduit means to said device, a fluid discharge connection between said device and said restricted passage for delivering a quantity of measured fluid from said device to said conduit means, said device comprising a housing which is divided into two variable volume chambers by a fluid pressure responsive member, one chamber communicating with said conduit means and the other chamber communicating with said discharge connection, stops provided on opposite end walls of both chambers whereby said fluid pressure responsive member is limited in its movement in opposite directions, a spring yieldably urging said member toward the stop in said one chamber, one-way check valve means mounted in said discharge connection to prevent fluid from flowing from said restricted passage into said other chamber but to allow fluid flow from said other chamber to said restricted passage, said member operating in response to fluid pressure in said conduit means to force fluid from said second chamber into said restricted passage of said conduit means, said conduit means being provided with a coupling on the side of said restricted passage opposite the operating connection between said conduit means and said control device for attachment to a fluid-tight storage reservoir, and a control valve in said conduit means on the same side of said restricted passage as the last-mentioned operating connection for selectively admitting pressure fluid to said conduit means and for draining fluid from said conduit means whereby said reservoir is both filled and drained through said conduit means.

8. Apparatus for mixing automatically different fluids in predetermined proportions and delivering the mixture to a reservoir comprising conduit means having a restricted passage therein, a control device having an operating connection with said conduit means whereby fluid pressure may be conducted from said conduit means to said device, a fluid discharge connection between said device and said restricted passage for delivering a quantity of measured fluid from said device to said conduit means, said device comprising a housing which is divided into two variable volume chambers by a fluid pressure responsive member, one chamber communicating with said conduit means and the other chamber communicating with said discharge connection, stops provided on opposite end walls of both chambers whereby said fluid pressure responsive member is limited in its movement in opposite directions, means yieldably urging said member toward the stop in said one chamber, one-way check valve means operatively connected to said discharge connection to prevent fluid from flowing from said restricted passage into said other chamber but to allow fluid flow from said other chamber to said restricted passage, said member operating in response to fluid pressure in said conduit means to force fluid from said second chamber into said conduit means, and a control valve in said conduit means on the same side of said restricted passage as said operating connection for selectively admitting pressure fluid to said conduit means and for draining fluid from said conduit means.

9. Apparatus for mixing automatically different fluids in predetermined proportions and delivering the mixture to a reservoir comprising conduit means having a restricted passage therein, a control device having an operating connection with said conduit means whereby fluid pressure may be conducted from said conduit means to said device, a fluid discharge connection between said device and said conduit means for delivering a quantity of measured fluid from said device to said conduit means, said device comprising a housing which is divided into two variable volume chambers by a fluid pressure responsive member, one chamber communicating with said conduit means and the other chamber communicating with said discharge connection, stops provided on opposite end walls of both chambers whereby said fluid pressure responsive member is limited in its movement in opposite directions, means yieldably urging said member toward the stop in said one chamber, one-way check valve means operatively connected to said discharge connection to prevent fluid from flowing from said conduit means into said other chamber but to allow fluid flow from said other chamber to said conduit means, said member operating in response to fluid pressure in said conduit means to force fluid from said second chamber into said conduit means, and a control valve in said conduit means for selectively admitting pressure fluid to said conduit means and for draining fluid from said conduit means.

10. Apparatus for combining a plurality of different fluids in predetermined proportions comprising a fluid-metering device having a fluid-receiving chamber provided with an inlet and an outlet, valve means associated with said inlet and outlet for permitting only unidirectional flow through said chamber, an operating chamber in said device, a fluid pressure responsive member separating both chambers, conduit means for conducting pressure fluid between two different points, a fluid-conducting connection between said conduit means and said operating chamber, a discharge connection between said fluid-receiving chamber outlet and said conduit means, back pressure from said conduit means operating said pressure responsive member to eject fluid from said fluid-receiving chamber through said discharge connection, and a control valve in said conduit means for controlling the admission of fluid thereto, said fluid-metering device operating to receive fluid through said inlet and said valve means into said fluid-receiving chamber when said control valve is turned off and further operating to expel said received fluid when said control valve is turned on.

References Cited in the file of this patent

UNITED STATES PATENTS

| Number | Name | Date |
|---|---|---|
| 2,445,540 | Smillie | July 20, 1948 |
| 2,573,299 | Bast | Oct. 30, 1951 |
| 2,645,466 | Jones | July 14, 1953 |